3,267,065
VINYL AMINE MODIFIED CLAY PROCESS
Richard G. Shaler, Jr., San Rafael, and Raymond L. McAdam and Richard G. Shaler, San Anselmo, Calif., assignors, by mesne assignments, to American Tansul Company, Las Vegas, Nev., a corporation of California
No Drawing. Filed June 7, 1961, Ser. No. 115,312
8 Claims. (Cl. 260—41)

This invention relates to a process for modifying clays of the swelling gelling type. More particularly, it relates to a process for modifying swelling gelling clays such as hectorite with a vinyl substituted cyclic amine. In addition, it relates to the use of the vinyl substituent as a means for incorporating a polymer in the clay.

The primary object of the present invention is to provide a process for obtaining vinyl amine modified clays of the foregoing type. The product of the process has found utility in several different areas. Certain of the amine clays have been found to be well suited for use in the treatment of beer as a stabilizing agent. This use is described and claimed in copending application Serial No. 115,328, filed June 7, 1961.

The monomeric vinyl amine modified clay product of the present process is suitable for use as a semi-plastic material in formulations where a clay product having such a consistency is desired. The monomeric modified clay is also a convenient base material for the preparation of various polymeric plastic formulations. The polymerized products provided by the present process have desirable properties such as transparency, relatively high thermal resistance, and greater strength as compared with corresponding plastics not involving the clays employed in the present process.

Broadly, the present invention provides a process for the preparation of modified ion exchangeable clays which comprises contacting in the presence of $H^+$ a swelling gelling clay with an amine selected from the group consisting of vinyl substituted 5 and 6 membered cyclic amines and homopolymers and copolymers thereof.

The clays contemplated for use in the present process include all ion exchangeable clays of the swelling gelling type and include for example, the following types and classes of clays:

Cation-exchangeable inorganic clays—
  A. Natural clays:
    Bentonites
      Wyoming bentonite
      Montmorillonites
        Hectorite
    Beidellite
    Saponite
    Nontronite
    Sepiolite
    Biotite
    Vermiculite
    Zeolites
      Edingtonite
      Chabazite
      Natrolite
      Mordenites
  B. Synthetic clays:
    Magnesia-silica-sodium oxide
    Lime-silica-potassium oxide
    Baria-silica-lithium oxide
  C. Synthetic zeolites:
    Complex aluminum silicates
      Exchangeable cation:
        Hydrogen
        Sodium
        Potassium
        Barium
        Magnesium
        Ammonium While any of the foregoing may be suitably used, it is preferred to use a montmorillonite clay, particularly hectorite.

The starting amine reactants for the present process include 5 and 6 membered substituted cyclic amines wherein there is at least one substituent on the ring containing a vinyl group. The vinyl group itself may be on one of the carbon atoms in the ring or on the nitrogen atom itself as in N-vinyl pyrrolidone. Preferably, the vinyl substituent is a mono-olefinic straight chain hydrocarbon such as the vinyl group itself, the allyl group or the like having up to 12 carbon atoms or more.

Other non-interferring substituents may also be substituted on the ring including the lower alkyl radicals having from 1 to 6 carbon atoms. The rings themselves may be unsaturated such as in pyridine, pyrroline, and pyrrole, or saturated as in the hydrogenated analogs of the foregoing such as for example, pyrrolidine. Preferably, the ring atoms include only carbon and one nitrogen atom.

The process is carried out by intermixing or contacting a suitable clay with a suitable vinyl substituted cyclic amine of the types described above in aqueous solution in the presence of $H^+$. This induces an ion exchange reaction wherein the amine is exchanged for the exchangeable cation in the clay. The amine modified clay may then be recovered from solution, dried or further processed as desired by any suitable method.

The $H^+$ in solution is conveniently supplied by any suitable organic acid or inorganic acid. Preferably, the acid employed is a strong acid such as benzene sulfonic acid, hydrochloric acid, and the like.

The reaction is conveniently conducted at atmospheric pressure and room temperature although these conditions may be varied as desired as will be obvious to those skilled in the art.

Preferably, the amine is used in a stoichiometric excess with respect to the exchange capacity of the clay selected. This will result in maximum modification of the clay. Here again however, the amount of amine employed may be varied to suit the particular conditions or purposes for which the final product is desired.

The order of combination of the reactants may be varied as desired. Thus, it is possible to convert the clay to hydrogen form by mixing the clay with acid and then adding the amine. Alternatively, it is suitable to convert the amine to an acid salt and then contact the amine acid salt with the clay in aqueous solution and thereby cause the desired ion exchange to occur.

As previously noted, the present invention contemplates modification of the clays with the vinyl substituted amine monomer or by homopolymers or copolymers thereof. In this regard it is preferred to modify the clay with the monomer as described above and then polymerize the monomeric clay. It is possible however, to first form polymers of the monomeric amine and then modify the clay with the polymer itself using the same techniques herein discussed.

Suitable polymers, either pre-formed and then added to the clay, or formed directly by reaction with monomer modified clay, include all polymers capable of being formed from a vinyl substituted amine of the type previously discussed. Generally, vinyl containing materials will form polymers therewith under appropriate conditions as is well understood in the art. For example, appropriate conditions might involve the use of heat and/or catalysts such as organic peroxides to form the polymers.

Some of the suitable materials for polymerization with the previously discussed monomeric amine reactants in accordance with the present process for modifying the clays include identical amines to form homopolymers and vinyl compounds such as methacrylic acid, crotonic acid, vinylacetic acid, acrylic acid, allylacetic acid, various other unsaturated acids, styrene, and the like which are capable of forming copolymers.

For commercial feasibility the clay is not directly modified with the selected cyclic amine. This is because the direct modification is very difficult and time consuming, requiring for example, running the naturally occurring clay through an ion exchange column containing the hydrogen ion source for conversion to its $H^+$ form.

Rather, in the preferred embodiment, hectorite is used as the starting clay reactant and, as is well understood, naturally occurs as a sodium clay. Before modifying the clay with the amine, the clay is converted to a calcium clay with, preferably, a calcium salt such as calcium chloride.

This conversion may be executed in accordance with the process described in copending application Serial No. 44,487, filed June 13, 1960. As therein described, the conversion is generally carried out by adding the desired calcium salt in an amount of at least 85 milliequivalents per 100 grams of clay in solution to another aqueous dispersion of the clay in which the hectorite is preferably dispersed in water in a range of about 4% to 6% solids. Agitation should be carried out thoroughly until the reaction is complete; that is, until the salt is completely distributed throughout the aqueous dispersion of the clay. The time necessary to accomplish this will depend upon the amounts reacted and the ion exchange characteristics of the reactant.

The hectorite clay in calcium form is then used in place of the naturally occurring sodium clay in the present invention. Thus, the calcium clay is treated with the amine in the presence of acid to cause the modification of the clay. In most cases best results are obtained by first treating the calcium clay with a strong acid such as hydrochloric to convert the calcium clay to $H^+$ form. Then the selected vinyl substituted cyclic amine is added to the clay as before, with polymers being introduced in the clay if desired.

The preferred embodiment in which the hectorite clay is first converted to a calcium form has the advantage of decreasing and thickening and gel formation encountered when the normal clay is contacted with the acid. In an extreme case the strong acid may even destroy the normal clay structure. In the preferred sequence of steps, such problems are virtually eliminated.

The following example will illustrate the present process:

*Example*

A 5% aqueous slurry of 25 grams of purified hectorite is reacted with 1.38 grams of an aqueous solution of calcium chloride and thoroughly agitated until the calcium chloride has reacted with substantially all of the clay. The resulting calcium clay is washed with dilute hydrochloric acid and results in a hydrogen clay.

A 1½ times stoichiometric excess of 4-vinyl pyridine is added to the hydrogen clay. The reaction product flocculates and is filtered to provide a 4-vinyl pyridine modified hectorite.

The unpolymerized modified clay obtained above is suitable for use as a molding composition. When the flock obtained as above is placed into a mold, shaped, and dried, the result is a hardened plastic-type mass.

Alternatively, the monomeric reaction product may be used as a polymerization base for polyester, epoxy, urethane, and styrene resin-clay formation. Thus, the 4-vinyl pyridine hectorite obtained above is reacted with styrene under normal polymerization conditions and a styrene-4-vinyl pyridine-hectorite clay complex product is obtained.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A process for the preparation of modified ion exchangeable clays consisting essentially of contacting in the presence of $H^+$ a swelling gelling cation exchangeable clay with an amine selected from the group consisting of vinyl substituted 5 and 6 membered cyclic amines and homopolymers and copolymers thereof, exchanging $H^+$ for the naturally-occurring exchangeable clay cation, attaching said amine to the clay through the $H^+$ in the form of an amine acid salt ion, and recovering amine acid salt modified clay.

2. A process in accordance with claim 1 wherein the clay is hectorite.

3. A process for the preparation of modified ion exchangeable clays consisting essentially of contacting an aqueous solution of a swelling gelling cation exchangeable clay with a vinyl pyridine in the presence of an acid, exchanging vinyl pyridine acid salt cation for the naturally-occurring exchangeable clay cation, and recovering vinyl pyridine acid salt modified clay.

4. A process in accordance with claim 3 wherein the clay is hectorite.

5. A process in accordance with claim 3 wherein the vinyl pyridine modified clay is further reacted by polymerizing it with a vinyl material.

6. A process for the preparation of modified hectorite consisting essentially of converting the naturally occurring sodium hectorite clay to calcium form with a calcium salt in an amount of at least 85 milliequivalents per 100 grams of clay, converting the calcium clay to $H^+$ form with a strong acid, and contacting the $H^+$ hectorite clay with an amine selected from the group consisting of vinyl substituted 5 and 6 membered cyclic amines and homopolymers and copolymers thereof, attaching said amine to the clay through $H^+$ in the form of an amine acid salt iron, and recovering amine acid salt modified clay.

7. A process for the preparation of modified hectorite consisting essentially of converting the naturally occurring sodium hectorite clay to calcium form with a calcium salt in an amount of at least 85 milliequivalents per 100 grams of clay, converting the calcium clay to $H^+$ form with a strong acid, contacting the $H^+$ hectorite clay with a vinyl pyridine, attaching the vinyl pyridine to the hectorite through the $H^+$ in the form of vinyl pyridine acid salt ion, and recovering vinyl pyridine acid salt modified hectorite.

8. A process in accordance with claim 7 wherein the vinyl pyridine modified hectorite is further reacted by polymerizing it with a vinyl material.

References Cited by the Examiner

UNITED STATES PATENTS

| | | | |
|---|---|---|---|
| 1,515,733 | 11/1924 | Cross | 252—455 |
| 2,531,396 | 11/1950 | Carter et al. | |
| 2,622,987 | 12/1952 | Ratcliffe. | |

(Other references on following page)

UNITED STATES PATENTS

| | | |
|---|---|---|
| 2,623,013 | 12/1952 | D'Alelio. |
| 2,876,133 | 3/1959 | Iller et al. _____ 117—54 |
| 2,883,356 | 4/1959 | Gluesenkamp. |
| 3,012,050 | 12/1961 | Fox et al. |
| 3,024,209 | 3/1962 | Ferrigno. |

FOREIGN PATENTS

| | | |
|---|---|---|
| 665,474 | 1/1952 | Great Britain. |

OTHER REFERENCES

Ladoo et al.: "Nonmetallic Minerals," 2nd edition, McGraw-Hill Book Company, New York, pp. 93–96.

MORRIS LIEBMAN, *Primary Examiner.*

LEON J. BERCOVITZ, *Examiner.*

B. S. LEON, K. B. CLARKE, J. S. WALDRON,
*Assistant Examiners.*